(12) United States Patent
Zhang

(10) Patent No.: US 9,342,195 B2
(45) Date of Patent: May 17, 2016

(54) SYSTEM AND METHOD TO SHARE ELECTRODES BETWEEN CAPACITIVE TOUCH CONTROLLER AND GESTURE DETECTION DEVICE

(71) Applicant: Microchip Technology Incorporated, Chandler, AZ (US)

(72) Inventor: Ce Zhang, Pasing (DE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 330 days.

(21) Appl. No.: 13/792,823

(22) Filed: Mar. 11, 2013

(65) Prior Publication Data

US 2013/0249855 A1 Sep. 26, 2013

Related U.S. Application Data

(60) Provisional application No. 61/609,538, filed on Mar. 12, 2012.

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01); *G06F 2203/04101* (2013.01)

(58) Field of Classification Search
CPC ..... G06F 3/041; G06F 3/045; G06F 3/03547; G06F 3/0412; G06F 3/0414; G06F 3/046; G06F 3/047; G06F 2203/041; G06F 3/044; G06F 2203/04107; G06F 2203/04111; G06F 2203/04112; G06F 2203/04113; G06F 3/0416; G06F 2203/04101

USPC .................................................. 345/173–174
See application file for complete search history.

(56) References Cited

U.S. PATENT DOCUMENTS 5,945,980 A 8/1999 Moissev et al. ................ 345/173
8,487,905 B2 7/2013 Kandziora et al. ............ 345/174
(Continued)

FOREIGN PATENT DOCUMENTS

| DE | 102009030495 A1 | 1/2011 | ............... G01B 7/00 |
| DE | 102009051409 A1 | 5/2011 | ............... G01D 5/24 |
| WO | 2010/149543 A1 | 12/2010 | ............... G06F 3/041 |

OTHER PUBLICATIONS

International Search Report and Written Opinion, Application No. PCT/US2013/030391, 9 pages, Jun. 4, 2013.
(Continued)

*Primary Examiner* — Lun-Yi Lao
*Assistant Examiner* — Jarurat Suteerawongsa
(74) *Attorney, Agent, or Firm* — Slayden Grubert Beard PLLC

(57) ABSTRACT

A system may have a touch controller, a gesture detection device, and a capacitive sensor having at least one first and at least one second electrode, wherein the at least one first electrode is coupled with a controllable generator for supplying an AC signal to the first electrode. Furthermore, a configurable coupling is provided between the at least one second electrode, an input of the touch controller and an input of the gesture detection device, wherein the coupling can be configured to allow the system to perform a touch detection from signals received from the second electrode by the touch controller in a first configuration mode and to perform a gesture detection from signals received from the second electrode by the gesture detection device in a second configuration mode.

29 Claims, 9 Drawing Sheets

(56) References Cited

U.S. PATENT DOCUMENTS

| | | | |
|---|---|---|---|
| 2002/0190964 A1 | 12/2002 | Van Berkel | 345/173 |
| 2008/0174321 A1 | 7/2008 | Kang et al. | 324/686 |
| 2011/0007021 A1 | 1/2011 | Bernstein et al. | 345/174 |
| 2011/0031042 A1* | 2/2011 | Wu et al. | 178/18.06 |
| 2012/0050180 A1 | 3/2012 | King et al. | 345/173 |
| 2012/0050210 A1* | 3/2012 | King et al. | 345/174 |
| 2012/0169650 A1* | 7/2012 | Chang | 345/174 |

OTHER PUBLICATIONS

European Office Action, Application No. 13712977.1, 7 pages, Nov. 13, 2015.

* cited by examiner

SYSTEM AND METHOD TO SHARE ELECTRODES BETWEEN CAPACITIVE TOUCH CONTROLLER AND GESTURE DETECTION DEVICE

CROSS-REFERENCE TO RELATED APPLICATIONS

This application claims the benefit of U.S. Provisional Application No. 61/609,538 filed on Mar. 12, 2012, which is incorporated herein in its entirety.

TECHNICAL FIELD

The present disclosure relates to capacitive touch technology in particular to a system and method for sharing an electrode with a capacitive touch controller.

BACKGROUND

Capacitive sensors are often used in touch sensing systems. In such systems a user is required to touch an operating panel to allow sensing of such a touch by a respective detection circuitry of the system. More advanced systems do not require touching but can sense a gesture made in an area above the operating panel. For example, various systems exist that generate an electric field, for example using a signal in the range of 100 kHz, and a plurality of detection electrodes that are designed to measure disturbances of such an electric field to allow determination of a gesture made, for example, by a hand or an object within a three dimensional area above the sensors. It is very advantageous if both systems can be combined to form a human interface device. However, with respect to the sensors, both systems are generally incompatible and therefore in conventional systems, separate sensors are necessary for a combined touch and gesture detection system.

SUMMARY

A system may comprise a touch controller, a gesture detection device, a capacitive sensor having at least one first and at least one second electrode, wherein the at least one first electrode is coupled with a controllable generator for supplying an AC signal to said first electrode; and a configurable coupling between the at least one second electrode, an input of the touch controller and an input of the gesture detection device, wherein the coupling can be configured to allow the system to perform a touch detection from signals received from said second electrode by the touch controller in a first configuration mode and to perform a gesture detection from signals received from said second electrode by the gesture detection device in a second configuration mode.

According to a further embodiment, the coupling may comprise a switching arrangement operable to connect the second electrode to either the touch controller or the gesture detection device. According to a further embodiment, the switching arrangement may comprise a multiplexer. According to a further embodiment, the switching arrangement may comprise a Single Pole Double Throw switch (SPDT). According to a further embodiment, the system may further comprise a resistor connected between an input of the touch controller and ground. According to a further embodiment, the system may further comprise a current source coupled with the resistor. According to a further embodiment, the system may further comprise a resistor connected between an input of the gesture detection device and a DC voltage. According to a further embodiment, the system may further comprise a synchronization connection between the touch controller and the gesture detection device. According to a further embodiment, the synchronization connection may comprise a first synchronization line configured to signal a status from the touch controller to the gesture detection device and a second synchronization line configured to signal a status from the gesture detection device to the touch controller. According to a further embodiment, the synchronization connection may comprise a bidirectional communication interface between the touch controller and the gesture detection device. According to a further embodiment, the bidirectional communication interface can be an $I^2C$ interface. According to a further embodiment, the second electrode can be coupled with an input of the touch controller and an input of the gesture detection device, and wherein the input of the touch controller is operable to be switched into a high impedance mode when the coupling is configured to operate in the second configuration mode, wherein the controllable generator supplies the AC signal to the first electrode in the second configuration mode. According to a further embodiment, the system may further comprise a synchronization connection between the touch controller and the gesture detection device. According to a further embodiment, the synchronization connection may comprise a first synchronization line configured to signal a status from the touch controller to the gesture detection device and a second synchronization line configured to signal a status from the gesture detection device to the touch controller. According to a further embodiment, the synchronization connection may comprise a bidirectional communication interface between the touch controller and the gesture detection device. According to a further embodiment, the bidirectional communication interface can be an $I^2C$ interface. According to a further embodiment, the second electrode can be connected to an input of the gesture detection device, and the coupling may comprise a single pole single throw switch having a low off-isolation value and a low switch-on capacitance and being operable to connect the second electrode to the touch controller. According to a further embodiment, the second electrode can be connected to an input of the touch controller, and the coupling comprises a single pole single throw switch having a low off-isolation value and a low switch-on capacitance and being operable to connect the second electrode to the gesture detection device.

According to another embodiment, a method for performing touch and non-touch gesture detection in a system comprising a touch controller and a non-touch gesture detection device configured to be coupled with one electrode of a capacitive sensor device wherein another electrode of the capacitive sensor device is coupled with a controllable generator for supplying an AC signal to said another electrode, may comprise: configuring a coupling between the one electrode of said capacitive sensor and an input of the touch controller or an input of the gesture detection device, wherein the coupling is configured in a first configuration mode to allow the system to perform a touch detection from signals received from said second electrode by the touch controller and in a second configuration mode to perform a gesture detection from signals received from said second electrode by the gesture detection device, wherein the controllable generator supplies the AC signal to said another electrode when in said second configuration mode.

According to a further embodiment of the method, the coupling may comprise a switching arrangement between said second electrode and inputs of said touch controller and said gesture detection device, and the method may further comprise: during said first configuration mode decoupling the second electrode from the input of the gesture detection device and coupling the second electrode with the touch controller and during the second configuration mode decoupling the second electrode from the input of the touch controller and coupling the second electrode with the gesture detection device. According to a further embodiment of the method, the second electrode can be coupled with an input of the touch controller and an input of the gesture detection device, and the method may further comprise: during the second configuration mode switching the input of the touch controller into a high impedance mode. According to a further embodiment of the method, the method may further comprise a synchronization connection between the touch controller and the gesture detection device, the method further comprising the steps: signaling the end of a respective detection process by said gesture detection device and said touch controller to each other by means of the synchronization connection. According to a further embodiment of the method, the synchronization connection may comprise a first synchronization line configured to signal a status from the touch controller to the gesture detection device and a second synchronization line configured to signal a status from the gesture detection device to the touch controller. According to a further embodiment of the method, the synchronization connection may comprise a bidirectional communication interface between the touch controller and the gesture detection device. According to a further embodiment of the method, the method may further comprise: configuring the gesture detection device as a master and the touch controller as a slave device and communication data determined by the touch controller to the gesture detection device. According to a further embodiment of the method, the method may further comprise: communicating all data determined by the touch controller and the gesture detection device to a superior processor by said gesture detection device. According to a further embodiment of the method, the second electrode can be connected to an input of the gesture detection device, and the method may further comprise: during the first configuration mode connecting the second electrode to the touch controller using a single pole single throw switch. According to a further embodiment of the method, the second electrode can be connected to an input of the touch controller, and the method may further comprise: during the second configuration mode connecting the second electrode to the gesture detection device using a single pole single throw switch.

DETAILED DESCRIPTION

Figure 1:
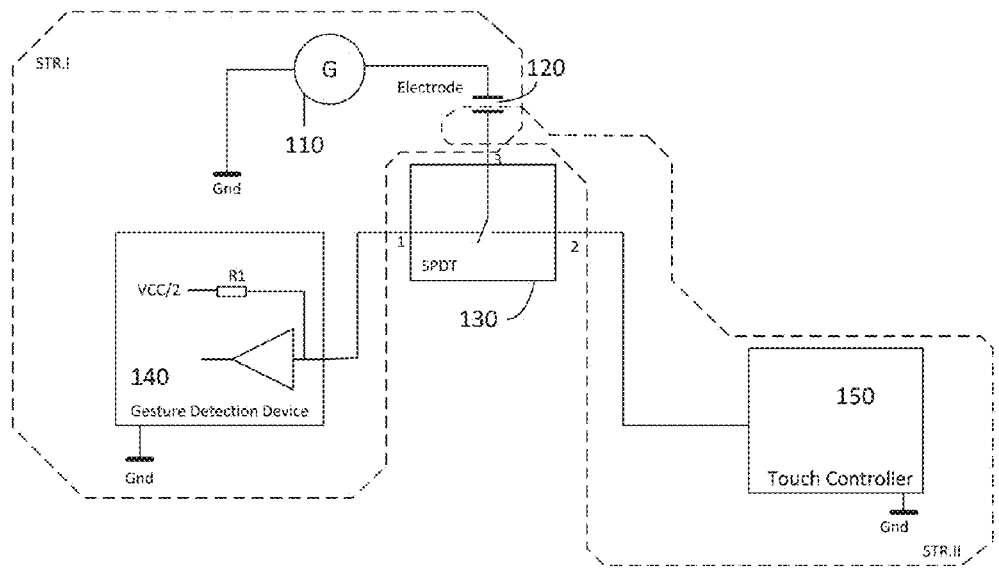
FIG. 1 shows a first embodiment of system sharing electrodes by using a SPDT.

According to various embodiments, two main concepts and two variants to share electrodes between gesture detection and capacitive touch controller can be provided. The first concept implemented with a SPDT (Single Pole Double Throw) multiplexer is also generally applied in other cases to share a signal between two or more devices. Another concept and its variants are specified for a gesture detection system. They are implemented without any additional device or only with a SPST (Single Pole Single Throw) switch. According to various embodiments, electrodes for gesture detection can be shared with a capacitive touch controller by using a low cost solution which also provides good performance in terms of settling time and signal strength. According to various embodiments, the gesture detection system works with a touch controller in time multiplexing mode. That means that gesture detection and touch detection are performed in different time slots.

While the following embodiments discuss sharing a single electrode between a touch controller and a gesture detection device, according to other embodiments multiple electrodes can be shared between the devices in a similar manner. The touch controller and gesture detection device each can be implemented in an integrated circuit device or may constitute a peripheral in a microcontroller device. Moreover, according to an embodiment, the touch controller and the gesture detection device may be implemented as peripherals in a microcontroller.

According to an embodiment, a touch controller may measure the capacitance of an electrode which is altered when touched, for example by a finger of a hand. To this end, for example a charge time measurement unit may be used. Alternatively, the capacitor formed by the electrode may vary an oscillator frequency in a touch controller. Other, embodiments of touch controllers using an electrode as a touch sensor may apply.

A gesture detection device comprises at least one receive electrode per physical dimension. For three-dimensional (3D) gesture detection a minimum number of three electrodes is required. Simultaneously, a touch controller may interpret an array of electrodes. In this document, these electrodes are generally referred to the second electrode as shown with the electrode 120 in the FIG. 1, while the first electrode is driven by a controllable generator supplying AC signal.

Capacitive electrodes can be simply metal plates, e.g. formed by a metal layer, for example by patterning the copper layer of a printed circuit board, by patterning a transparent layer of indium tin oxide, etc. Such electrodes may be in the form of a rectangle, square or any other suitable shape depending on the application. Capacitive electrodes can be external, for example on a housing surface of a respective device or internal, for example on the inside surface of a housing, a display, etc.

In a first concept for sharing electrodes shown in the following figures, a signal generator 110 provides an alternating electric field signal to a first electrode of a capacitive sensor 120. Capacitive sensor 120 is shown in all figures as having two electrodes wherein one electrode acts as a transmitter and one electrode acts as a receiver when operating as a gesture detection sensor. It is to be understood that a capacitive sensor 120 which can be used for gesture detection may have more than one receiver electrode and also can have more than one transmitter electrode. Although the symbol of the capacitive sensor shown in all Figures represents a capacitor, the electrodes of a gesture detection system need not be arranged opposite to each other as shown. Rather in most applications, these electrodes are arranged in the same plane or in parallel planes. According to other embodiments they may be arranged at an angle. The alternating electric field is generated between the transmitter electrode and the receiver electrode and their arrangement with respect to each other defines the three-dimensional space in which a gesture can be detected. For example, a 100 kHz signal may be generated by generator 110 and fed to a first electrode that is arranged, for example, coplanar to one or more receiving electrodes. The electrodes may be arranged at an appropriate distance from each other to define a detection field that extends vertically from the electrode planes, for example, up to 15 cm and horizontally depending on the distance between the electrodes. Hence, a relatively large three-dimensional detection space can be created by a single transmitter electrode and three associated receiving electrodes that may, for example surround the transmitter electrode.

For touch sensing, only a single electrode may be needed for a particular location and a plurality of electrodes can be used, for example arranged in a matrix, to detect a two-dimensional touches on a detection surface in which the touch electrodes are arranged. Thus, for touch applications the first electrode coupled with generator 110 is basically not required and during a touch detection mode, the generator may be turned off and only the one or more second electrodes are active.

Figure 2:
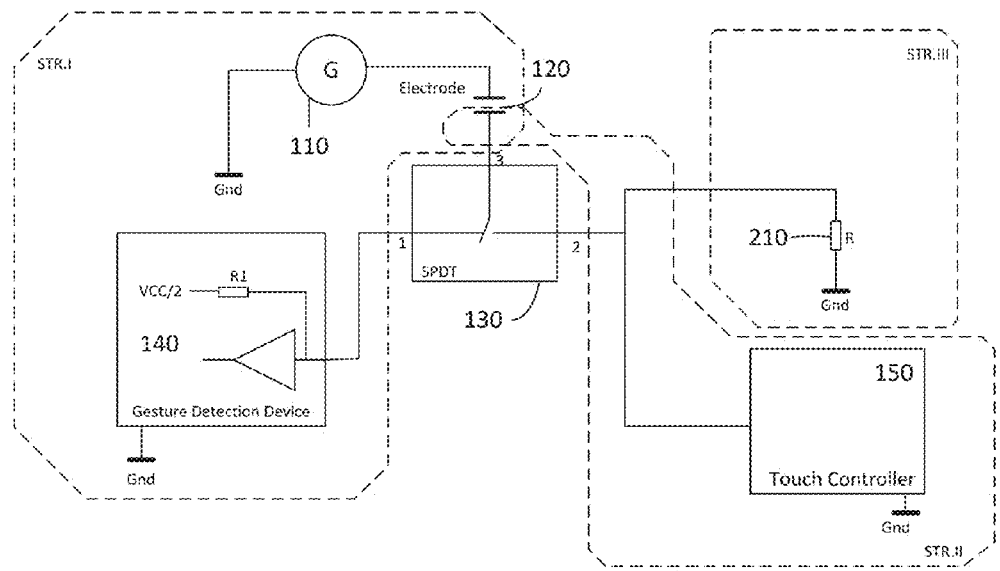
FIG. 2 shows an embodiment improving performance by using bypass resistors
Figure 3:
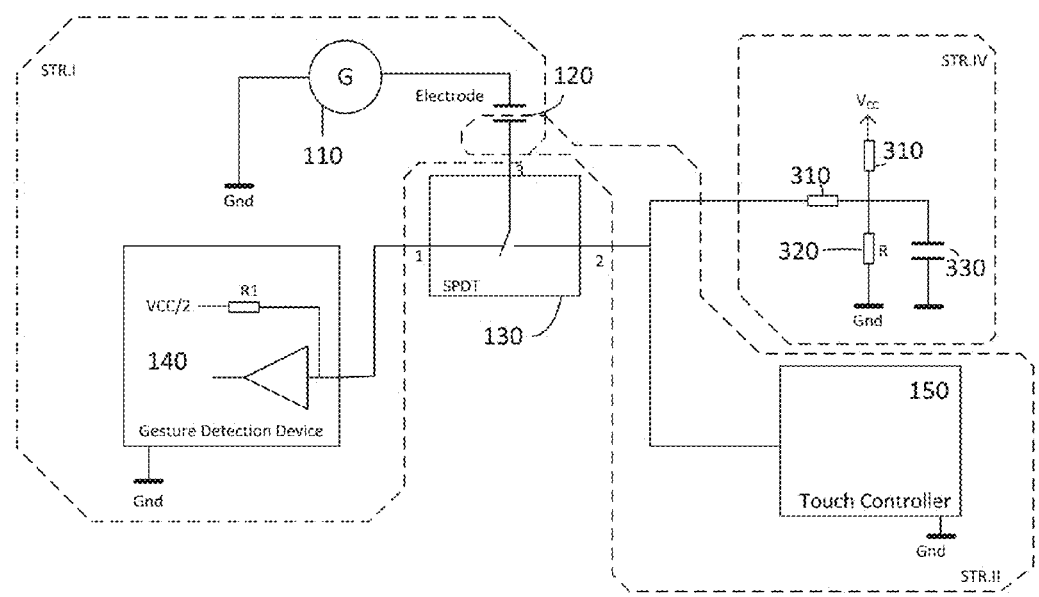
FIG. 3 shows an embodiment improving performance by using an additional current source

As shown in FIG. 1, which only shows a single second electrode, an analog multiplexer 130 (SPDT) is applied which switches receive signal paths from the second electrode of sensor 120 between touch controller 150 and a gesture detection device 140. The structure named STR.I and the structure named STR.II represent the gesture detection system and the touch detection system, respectively. Thus, as indicated by the dotted lines, for touch detection only the second electrode is used. To reduce signal disturbance between two channels, a multiplexer 130 with extra low off-isolation and extra low cross talking is chosen. Moreover, the switch-on capacitance has to be small in order to get a big signal strength of a receive signal which determines amplification factor and further noise added by the amplifier. Since the switch-off channel of a multiplexer 130 behaves like a capacitor, the potential change of pins of the touch controller side has a big influence on the signal strength of the gesture detection device 140. On the touch controller side, the pins should be connected to a fixed potential or set to a high impedance or even set to low status when the low status of touch controller pins can be proven as a constant low level signal and does not cause reducing signal strength of the gesture detection device 140 significantly. It is also recommended to set corresponding pins to high impedance. However, a small voltage change will show up with the status of high impedance on these pins which are mainly caused by internal capacitance change and leakage current. If the influence of the high impedance on gesture detection device 140 signals is not acceptable, this kind of influence can be further reduced by using bypassing resistor 210 like STR.III shown in FIG. 2. In some cases as shown in FIG. 3, a structure like STR.IV with resistors 310, 320, 340 and capacitor 330 can be implemented to decrease the influence of a high impedance status of touch controller pins on a gesture detection signal. In this way, the gesture detection signal performance may also be improved. However, this current source structure may affect the performance of touch detection by changing charging time and discharging time on electrodes during touch detection. But its influence should be very small, since the resistor 310 is configurable with a huge value, such as 10 MΩ.

Figure 4:
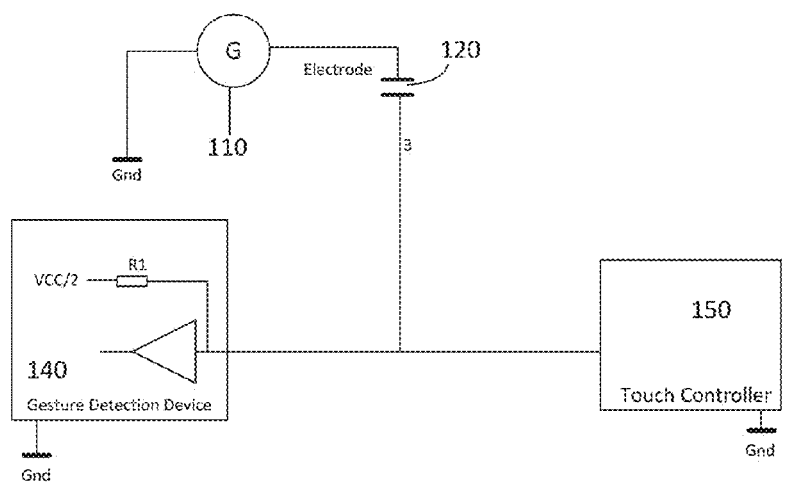
FIG. 4 shows an embodiment which shares the electrode directly

Based on the first implementation, a new concept which takes advantage of the input structure of a gesture detection system can be provided. As shown in FIG. 4, the pins of the touch controller 150 are directly connected to the analog input of the gesture detection system 140 which acts as high impendence for the touch signal. Touch controller 150 needs to set these pins to high impedance during gesture detection and needs to drive them for touch detection. Since these pins are internally connected to VCC/2 via large resistors like R1 within gesture controller 140, the touch controller 150 has to consider influence of this external current source in order to parameterize touch detection correctly. There are two variants based on this simplest structure.

Figure 5:
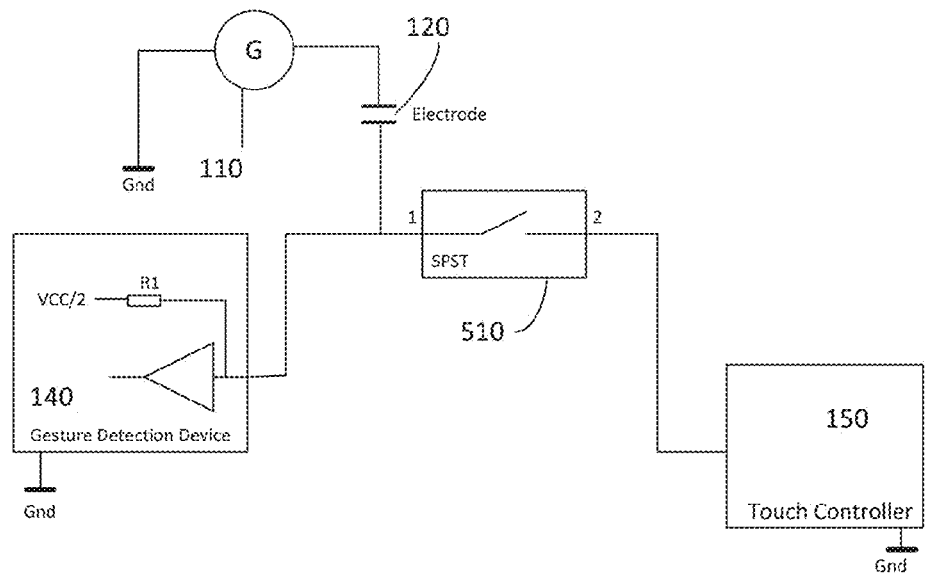
FIG. 5 shows an embodiment in which the electrode is shared by applying an SPST on the touch controller side
Figure 6:
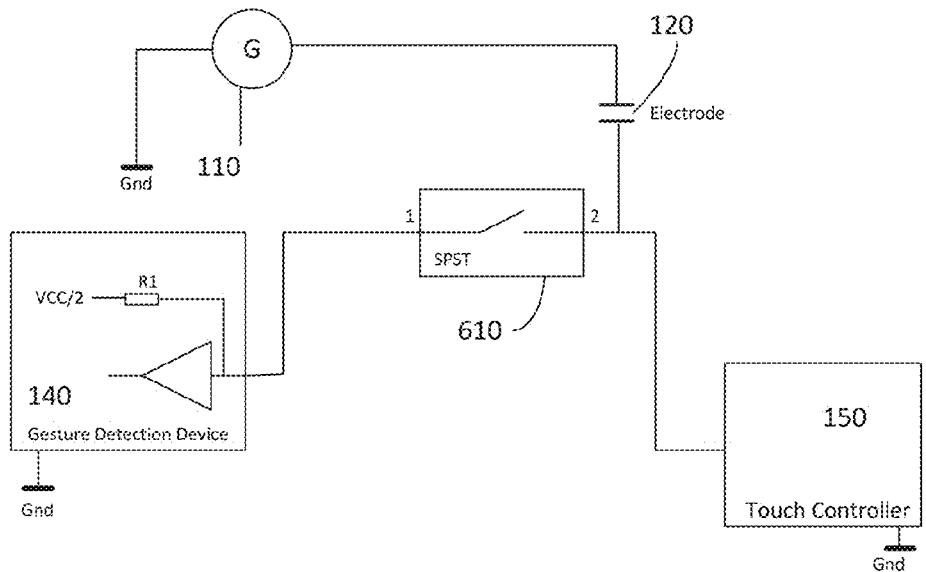
FIG. 6 shows an embodiment in which the electrode is shared by applying an SPST on the gesture controller side

If the touch controller 150 cannot set its pins to a high impedance (HighZ) or the high impedance configuration causes a long settling time, a switch (SPST) 510 can be put on the touch controller side to avoid the disturbance of the touch controller 150 as shown in FIG. 5. In other cases in which touch controller 150 cannot drive these pins properly because of electrical characteristic of the gesture detection system input, the input signal pins of the gesture detection system 140 can be isolated for touch detection by using a switch (SPST) 610 settled down on the gesture detection system side as shown in FIG. 6. In both cases, low off-isolation value and low switch-on capacitance of the switch are required to get better signal strength and to reduce the influence of the touch controller. Furthermore, the structures STR.III and structure STR.IV can also be used with the SPST switch 510 to reduce the influence of a high impedance status on the gesture detection system signal in the configuration shown in FIG. 5. Additionally, in the solution shown in FIG. 5, the pins of the touch controller can be set to low status, if the gesture detection system 140 remains sufficient in the signal strength and also enough constant in signal level.

The following discusses benefits of the hardware solution according to various embodiments:

1) Signal performance in terms of big signal strength and short settling time.

Switch-on capacitance of the multiplexer or of a SPST-switch is normally twice as big as their switch-off capacitance. Therefore, signal strengths of the gesture detection device 140 in FIGS. 1-3, and 6 are more reduced than in other configurations.

In ideal cases, a good signal performance can be expected which has short settling time, big signal strength and stable signal curve after settling time. In some worse cases, the configuration has to be used in which the disturbance of the high impedance status to the gesture detection device signal is avoided. Therefore, the signal performance has to be analyzed further. It is to be noted that the "settling time" in this context of following examples does not contain the time of extremely slow potential change showing up on touch controller pins.

Figure 7:
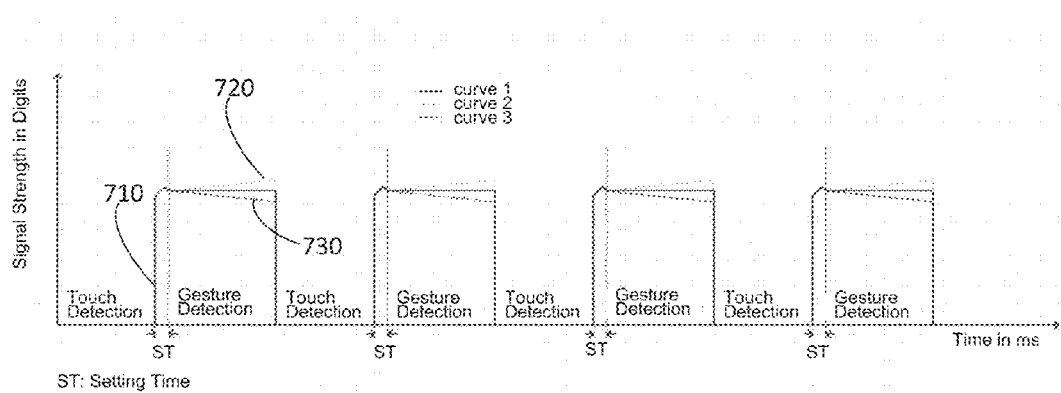
FIG. 7 shows a timing diagram

For example, as shown in FIG. 7, three gesture detection signals are demonstrated. The curve 710 shows the best performance of these curves. Curve 720 swings up slightly after settling time, while curve 730 swings down a little. These two curves may still be acceptable under following two conditions:

Condition 1: the change after settling time is caused by unavoidable potential change on pins of touch controller 150 and by the switch device for changing status.

Condition 2: the change after settling time should be very small, such as 60 digits per 1 minute. In fact, the gesture detection device 140 only has a small working time slot which amounts to about 80 ms. This kind of performance is considered as good if the signal has a smooth curve without any significant change in the whole time slot. Meanwhile, in each repeated time slot, the curve should show identical performance in value and in tendency of curve.

2) Hardware cost is also an important factor for a decision. The solution with simplest structure as, for example, shown in FIG. 4 may be considered first. After that, a SPST-switch has a price advantage over an analog multiplexer.

Figure 8:
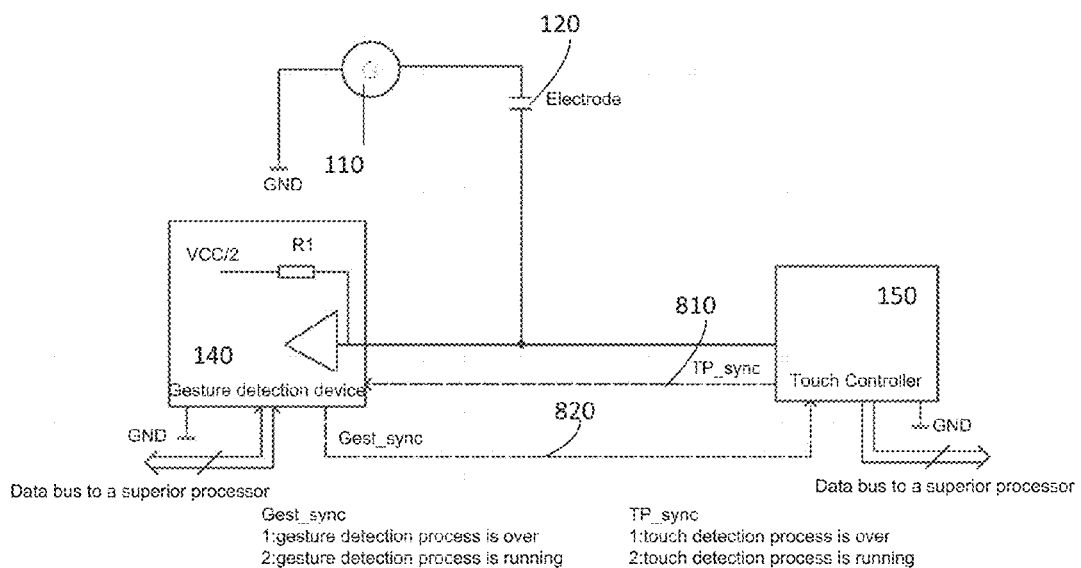
FIG. 8 shows an embodiment in which synchronization is performed with two sync lines.

According to various embodiments, a configuration can be provided in which the input of gesture detection device 140 is connected directly to a touch controller 150. In this configuration as shown in FIG. 8, the generator 110 and gesture detection device 140 are only active for gesture detection. For touch detection, the touch controller 150 drives its pins to various signal levels to measure capacitance change on electrodes 120. The point of this configuration is that the high impedance status (HIGHZ) of the touch controller 150 which results in a floating status and small potential change on the touch controller pins only has an ignorable influence on the gesture detection. At the same time, the input structure of the gesture detection device 140 shows a high impedance which also has less influence on the touch detection. Moreover, the current source of the gesture detection device input can also reduce the influence of potential change which is caused by the high impedance status. Since the resistor R1 from input structure of the gesture detection device 140 has a huge value, this current source can affect charging process and discharging process on touch pins for touch detection very slightly. Therefore, its influence is also ignorable. In this way, both detection processes can be performed very well in time multiplexing mode. To implement time multiplexing mode between the touch controller 150 and the gesture detection device 140, there are a few methods for synchronizing working statuses of both controllers 140, 150.

Figure 9:
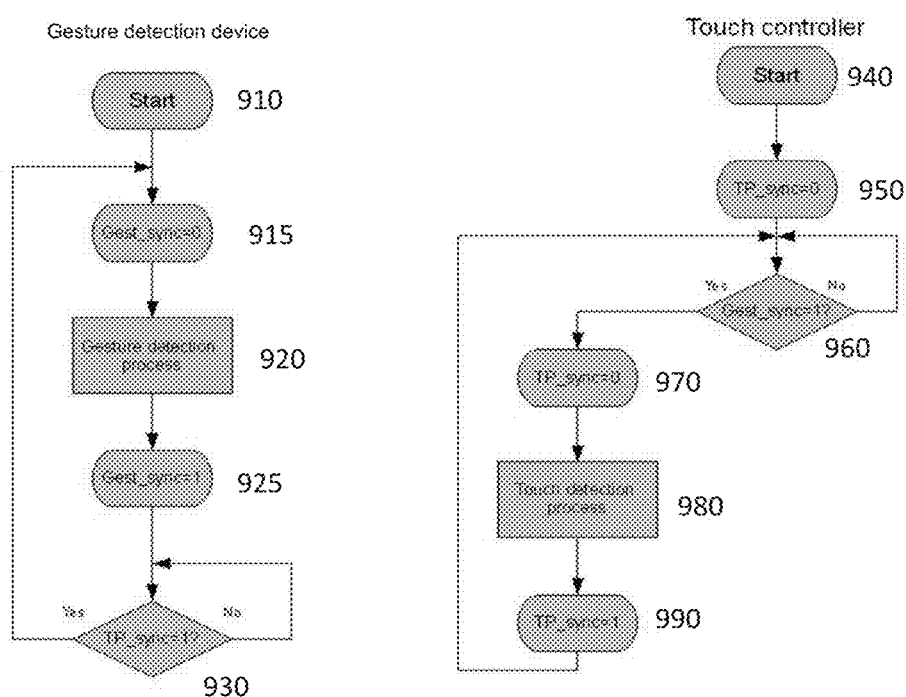
FIG. 9 shows flow charts of the working processes according to an embodiment.

For instance, FIG. 8 shows a configuration with synchronization by using two sync-lines 810, 820. The gesture detection device 140 can drive a pin named Gest_sync coupled with line 820 to show its working status to the touch controller 150, while the touch controller uses the pin TP_sync coupled with line 810 to show its status to the gesture detection device 140. A high status on these pins means that a corresponding detection process is completed. This high status of these pins will cause an interrupt in the firmware immediately to change working flow. Each controller 140 and 150 may have a separate interface, such as a parallel or serial interface for coupling with a superior processor or system as shown in FIG. 8. FIG. 9 shows the working processes of the gesture detection device 140 firmware and of the touch controller 150 firmware. Note that interrupt routines of the sync-lines 810, 820 are not included in FIG. 9.

For the gesture detection device 140, the routine starts in step 910 followed by a status setting of line 820 to '0'. in step 920 the gesture detection process is performed followed by step 925 in which the status line 820 is set to '1'. A loop 930 waits for the touch controller status line 810 to be set to '1'.

For the touch controller 150, the routine starts at step 940 followed by setting the touch status line 810 to '0'. The routine waits in step 960 until status line 820 is set to '1'. If so, the status line 810 is set to '0' in step 970 followed by the touch detection process in step 980. After performing the touch detection the status line 810 is set to '1' in step 990 and the routine returns to step 960.

Figure 10:
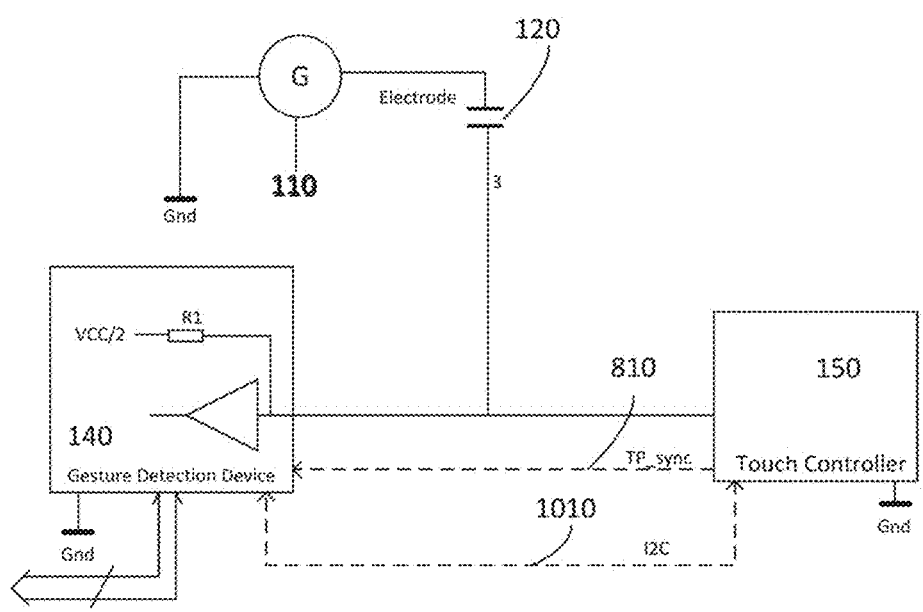
FIG. 10 shows another embodiment using I$^2$C for synchronization.

Similar to this method, according to yet another embodiment, a communication interface 1010 could be used to synchronize working processes between both sides. As shown in FIG. 10, an I²C interface 1010 is involved to send start-command for the touch detection and to read touch results from the touch controller 150. In this way, the gesture detection device 140 acts as master, while the touch controller 150 serves as a slave. However, this assignment could also be reversed in other embodiments. Moreover, according to other embodiments, other communication interfaces such as RS232, SPI, any type of single wire serial communication interface, etc. can be used. In addition, FIG. 10 shows another communication interface within the gesture detection device 140, for example a parallel or serial interface for connection to a superior processor or system. Due to the fact that in such an arrangement the gesture detection device 140 is the master and collects all data from the touch controller 150, the touch controller does not need to be equipped with an additional interface. According to yet another embodiment, as mentioned before, the I2C interface could also be used for communication with a superior processor or system instead of the additional interface.

After the touch detection is completed, status line 810 will be set to '1' to make the gesture detection device 140 start reading touch data by causing an interrupt. FIG. 11-14 describe the main working processes of the master and the slave, respectively. Again, it should be noted that interrupt routine for the sync-line TP_sync is not included. In this configuration, touch detection results and gesture detection results can be transmitted through a communication interface 1010 to other processors. Furthermore, the gesture detection device 140 can perform a detection in x-, y-, and z-directions. Therefore, the length of time slot for gesture detection is also configurable regarding the position in the z-direction.

Figure 11:
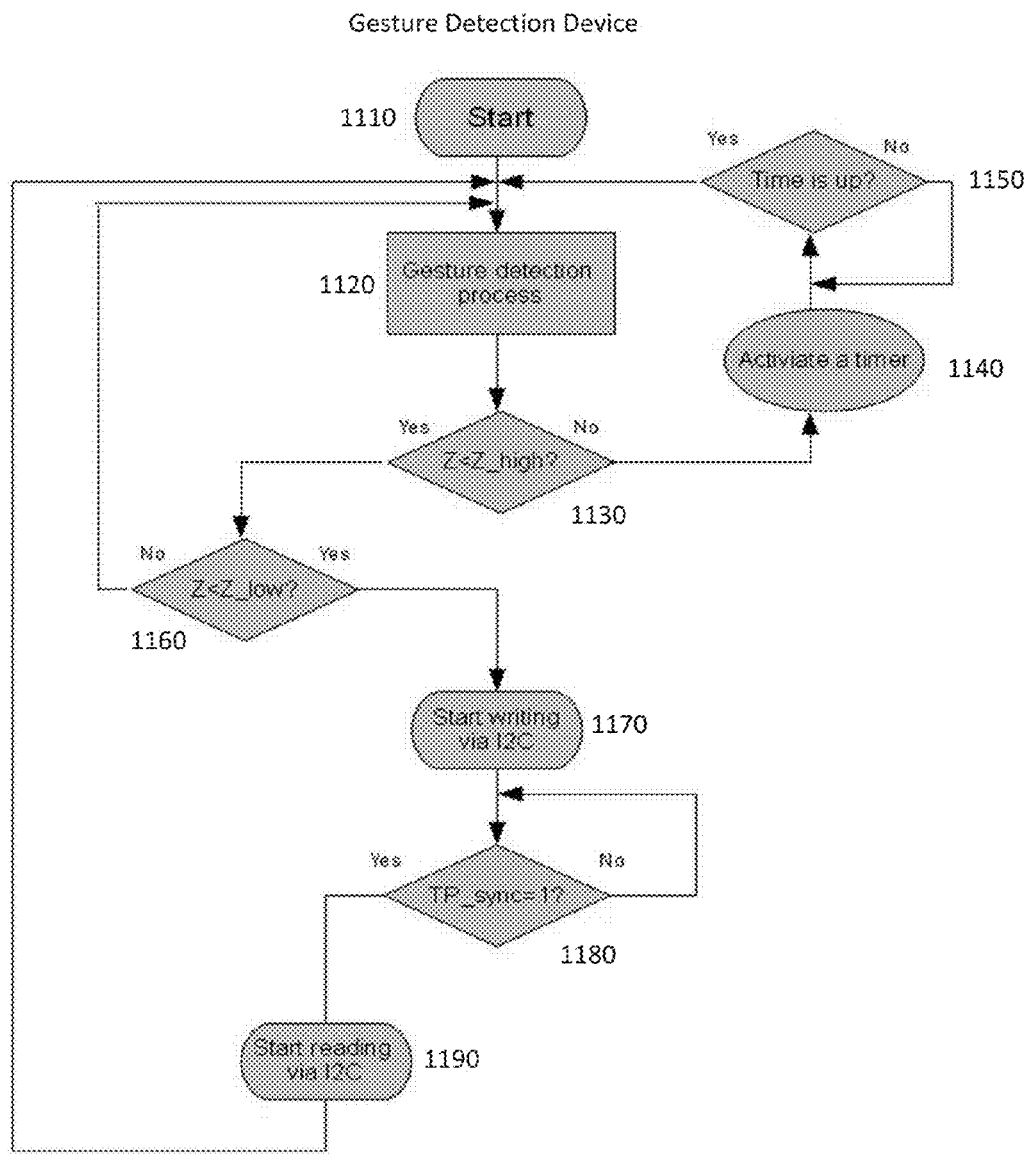
FIG. 11 shows another flow chart of the working process on the master side

FIG. 11 shows an exemplary routine for the gesture detection device 140 according to the embodiment shown in FIG. 10. the routine starts in step 1110 followed by step 1120 in which the gesture detection process is performed. The following step 1130 checks whether the Z-position of a detected object is smaller than a first threshold Z_high. If not, then a timer is started in step 1140 followed by a loop 1150 to check if the timer has expired. If so the routine returns to step 1120.

If the Z-position check in step 1130 determines that a detected position is smaller than threshold Z_high then it will be checked in step 1160 whether the Z-position is lower than a second threshold Z_low. If not, then the routine returns to step 1120. Otherwise, the routine starts writing control data to the touch controller and optionally data to other devices via the I²C interface 1010 in step 1170. The control data for touch controller 140 may include a command to start the touch detection process. In the following step 1180, the routine waits until the status line 810 is set to '1'. If so, the routine starts reading data from the touch controller 150 via the I²C interface 1010 and returns to step 1120.

Figure 12:
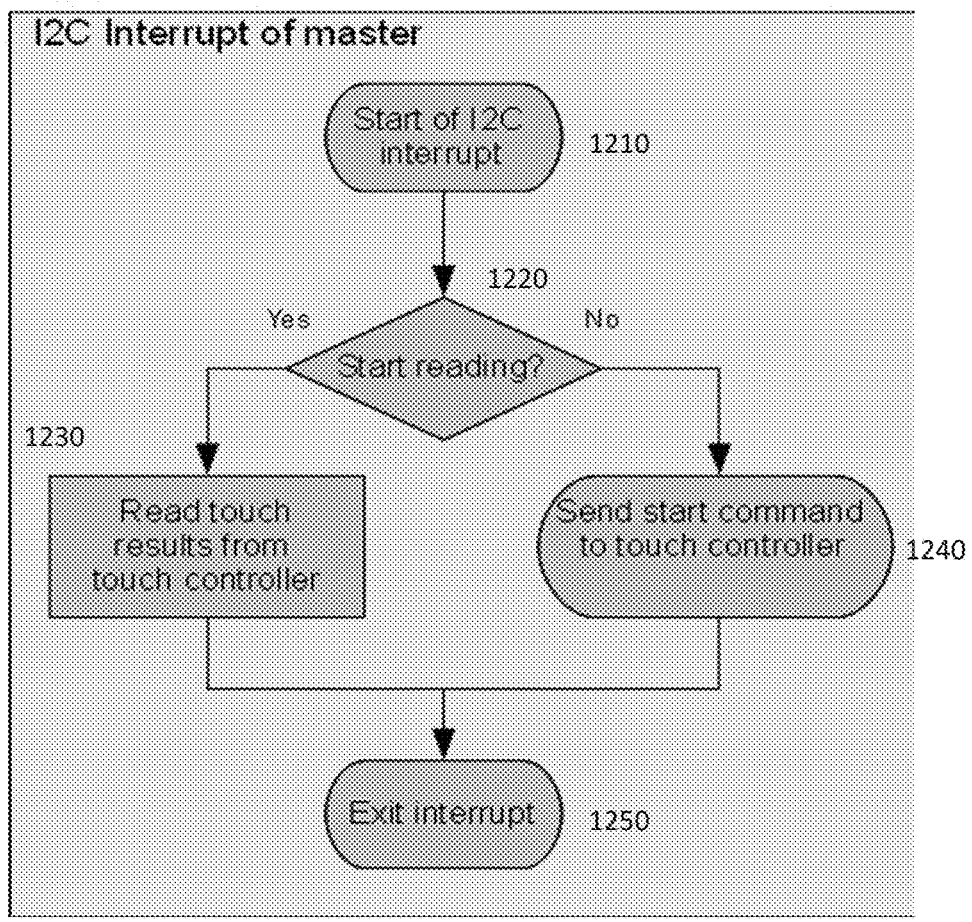
FIG. 12 shows an I$^2$C interrupt routine of the master.

FIG. 12 shows an exemplary associated I²C interrupt routine for the master, for example gesture detection device 140. The routine starts in step 1210 followed by a decision whether to start reading in step 1220. If yes, the routine branches to step 1230 in which the touch results from touch controller 150 are read via I²C interface 1010 followed by an exit from interrupt in step 1250. If it has been determined that reading will not be performed in step 1220 then a start command is sent to touch controller 150 via I²C interface 1010 in step 1240 followed by an exit from interrupt in step 1250.

Figures 13, 14:
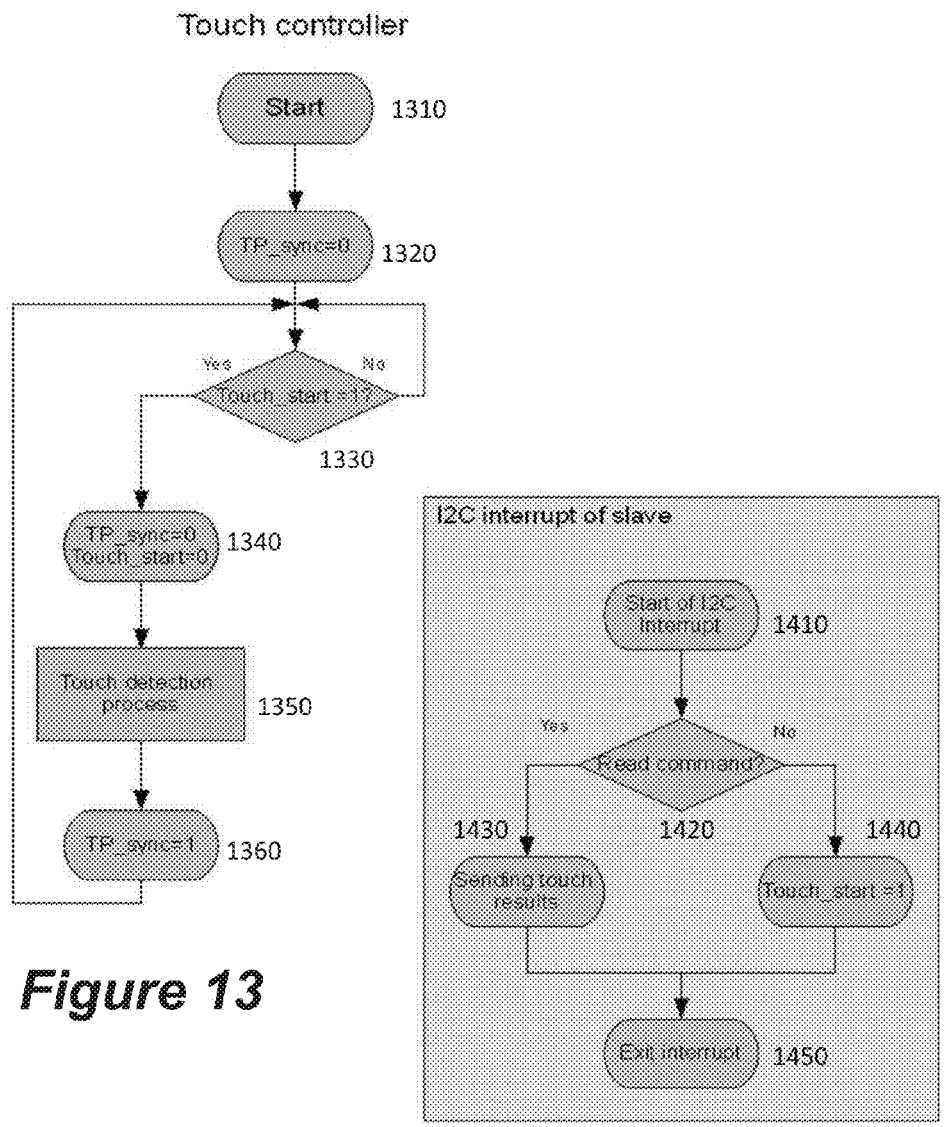
FIG. 13 shows another flow chart of the working process on the slave side.
FIG. 14 shows an I$^2$C interrupt routine of the slave.

FIG. 13 shows an exemplary routine for the touch controller 150 in the system of FIG. 10. The routine starts in step 1310 followed by step 1320 in which the status line 810 is set to '0'. Then in step 1330, the routine waits until a start command has been received and, for example, an associated flag touch_start has been set to '1'. If so, the routine branches to step 1340 in which the status line 810 and the touch_start flag are set to '0'. Then the touch detection process is performed in step 1350. In the following step 1360 the status line 810 is set to '1' and the routine returns to step 1330.

The associated interrupt routine for the slave, for example touch controller 150 is shown in FIG. 14. The routine starts with step 1410 followed a determination whether a read command is to be performed in step 1420. If yes, the routine branches to step 1430 in which touch results are sent through the I$^2$C interface 1010 followed by an exit from interrupt in step 1450. If the determination in step 1420 is 'no', the routine branches to step 1440 in which the touch_start flag is set to '1' followed by an exit from interrupt in step 1450.

What is claimed is:

1. A system comprising:
    a capacitive touch controller,
    a gesture detection device,
    a capacitive sensor having at least one first and at least one second electrode, wherein the at least one first electrode is coupled with a controllable generator for supplying an AC signal to said first electrode; and
    a configurable coupling between the at least one second electrode, an input of the touch controller and an input of the gesture detection device, wherein the coupling can be configured to allow the system to perform a touch detection from signals received from said second electrode by the touch controller in a first configuration mode in which said controllable generator is turned off and to perform a gesture detection from signals received from said second electrode by the gesture detection device in a second configuration mode in which said controllable generator is turned on.

2. The system according to claim 1, wherein the coupling comprises a switching arrangement operable to connect the second electrode to either the touch controller or the gesture detection device.

3. The system according to claim 2, wherein the switching arrangement comprises a multiplexer.

4. The system according to claim 2, wherein the switching arrangement comprises a Single Pole Double Throw switch (SPDT).

5. The system according to claim 4, further comprising a resistor connected between an input of the touch controller and ground.

6. The system according to claim 5, further comprising a current source coupled with the resistor.

7. The system according to claim 1, further comprising a resistor connected between an input of the gesture detection device and a direct current (DC) voltage.

8. The system according to claim 1, further comprising a synchronization connection between the touch controller and the gesture detection device.

9. The system according to claim 8, wherein the synchronization connection comprises a first synchronization line configured to signal a status from the touch controller to the gesture detection device and a second synchronization line configured to signal a status from the gesture detection device to the touch controller.

10. The system according to claim 8, wherein the synchronization connection comprises a bidirectional communication interface between the touch controller and the gesture detection device.

11. The system according to claim 10, wherein the bidirectional communication interface is an I$^2$C interface.

12. The system according to claim 1, wherein the second electrode is coupled with an input of the touch controller and an input of the gesture detection device, and wherein the input of the touch controller is operable to be switched into a high impedance mode when the coupling is configured to operate in the second configuration mode, wherein the controllable generator supplies the AC signal to the first electrode in the second configuration mode.

13. The system according to claim 12, further comprising a synchronization connection between the touch controller and the gesture detection device.

14. The system according to claim 13, wherein the synchronization connection comprises a first synchronization line configured to signal a status from the touch controller to the gesture detection device and a second synchronization line configured to signal a status from the gesture detection device to the touch controller.

15. The system according to claim 13, wherein the synchronization connection comprises a bidirectional communication interface between the touch controller and the gesture detection device.

16. The system according to claim 15, wherein the bidirectional communication interface is an I$^2$C interface.

17. The system according to claim 1, wherein the second electrode is connected to an input of the gesture detection device, and the coupling comprises a single pole single throw switch having a low off-isolation value and a low switch-on capacitance and being operable to connect the second electrode to the touch controller.

18. The system according to claim 1, wherein the second electrode is connected to an input of the touch controller, and the coupling comprises a single pole single throw switch having a low off-isolation value and a low switch-on capacitance and being operable to connect the second electrode to the gesture detection device.

19. A method for performing touch and non-touch gesture detection in a system comprising a touch controller and a non-touch gesture detection device configured to be coupled with one electrode of a capacitive sensor device wherein another electrode of the capacitive sensor device is coupled with a controllable generator for supplying an AC signal to said another electrode, the method comprising:
    configuring a coupling between the one electrode of said capacitive sensor and an input of the touch controller or an input of the gesture detection device, wherein the coupling is configured in a first configuration mode to allow the system to perform a touch detection from signals received from said second electrode by the touch controller wherein said controllable generator is turned off and in a second configuration mode to perform a gesture detection from signals received from said second electrode by the gesture detection device, wherein the controllable generator is turned on to supply the AC signal to said another electrode when in said second configuration mode.

20. The method according to claim 19, wherein the coupling comprises a switching arrangement between said second electrode and inputs of said touch controller and said gesture detection device, the method further comprising
    during said first configuration mode decoupling the second electrode from the input of the gesture detection device and coupling the second electrode with the touch controller and during the second configuration mode decoupling the second electrode from the input of the touch controller and coupling the second electrode with the gesture detection device.

21. The method according to claim 20, wherein the second electrode is coupled with an input of the touch controller and an input of the gesture detection device, and the method further comprises:
during the second configuration mode switching the input of the touch controller into a high impedance mode.

22. The method according to claim 21, further comprising a synchronization connection between the touch controller and the gesture detection device, the method further comprising the steps:
signaling the end of a respective detection process by said gesture detection device and said touch controller to each other by means of the synchronization connection.

23. The method according to claim 22, wherein the synchronization connection comprises a first synchronization line configured to signal a status from the touch controller to the gesture detection device and a second synchronization line configured to signal a status from the gesture detection device to the touch controller.

24. The method according to claim 22, wherein the synchronization connection comprises a bidirectional communication interface between the touch controller and the gesture detection device.

25. The method according to claim 24, further comprising: configuring the gesture detection device as a master and the touch controller as a slave device and communication data determined by the touch controller to the gesture detection device.

26. The method according to claim 25, further comprising: communicating all data determined by the touch controller and the gesture detection device to a superior processor by said gesture detection device.

27. The method according to claim 19, wherein the second electrode is connected to an input of the gesture detection device, the method further comprising:
during the first configuration mode connecting the second electrode to the touch controller using a single pole single throw switch.

28. The method according to claim 19, wherein the second electrode is connected to an input of the touch controller, the method further comprising:
during the second configuration mode connecting the second electrode to the gesture detection device using a single pole single throw switch.

29. A system comprising:
a capacitive touch controller,
a gesture detection device configured to determine a three-dimensional position of an object from signals received from a plurality of receiving electrodes,
a capacitive sensor having at least one first and at least one second electrode, wherein the at least one first electrode is coupled with a controllable generator for supplying an AC signal to said first electrode; and
a configurable coupling between the at least one second electrode, an input of the touch controller and an input of the gesture detection device, wherein the coupling can be configured to allow the system to perform a touch detection from signals received from said second electrode by the touch controller in a first configuration mode in which said controllable generator is turned off and to perform a gesture detection from signals received from said second electrode by the gesture detection device in a second configuration mode in which said controllable generator is turned on, wherein said at least one first electrode is used as a transmitting electrode to generate an electric field and the at least one second electrode is used as one of the plurality of receiving electrodes.

* * * * *